Sept. 27, 1932.  R. M. HILL  1,879,935
VARIABLE PITCH PROPELLER
Filed March 12, 1929
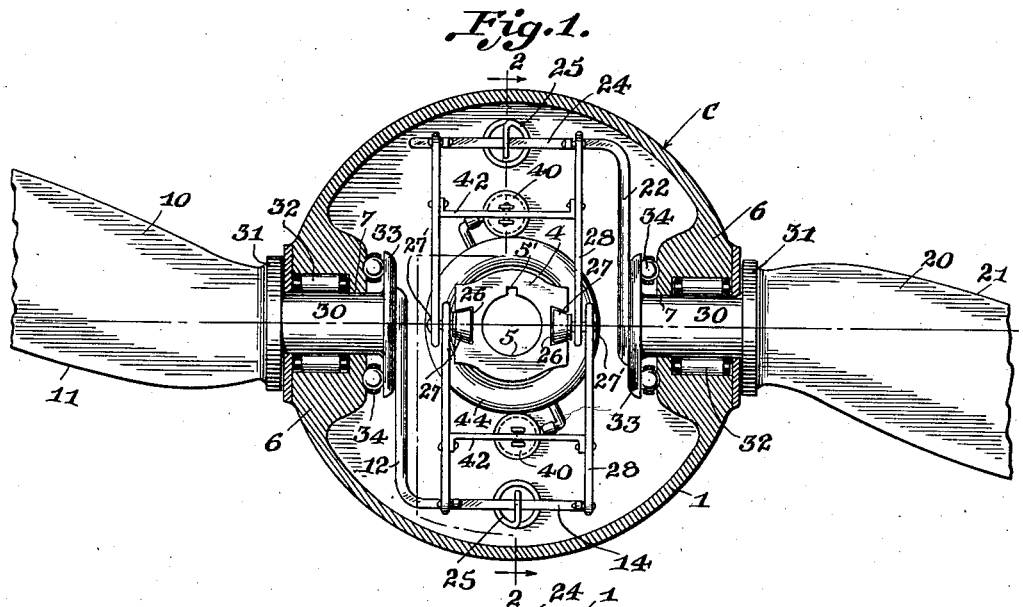
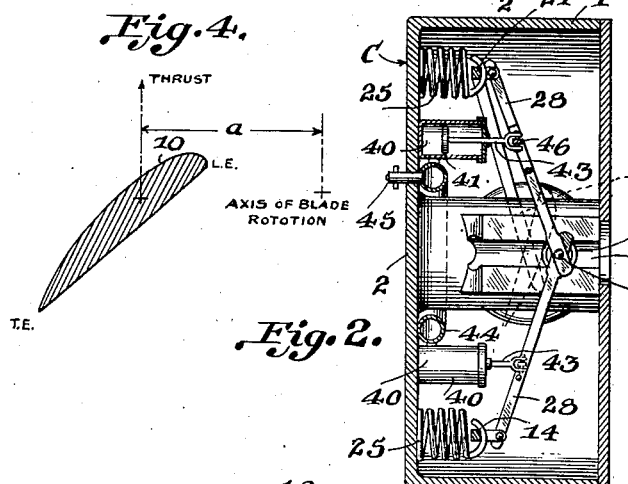
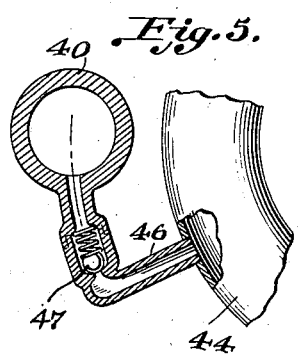
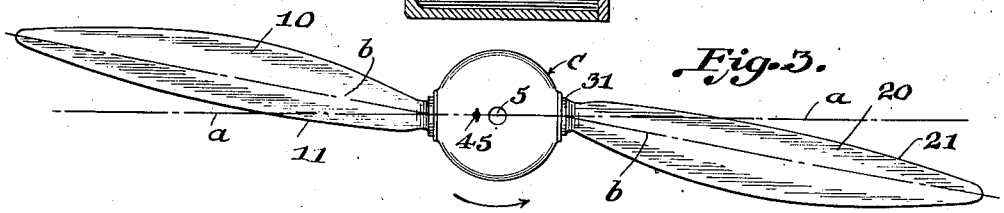
Inventor
Rowland M. Hill
By Albert E. Fock
Attorney Patented Sept. 27, 1932

1,879,935

UNITED STATES PATENT OFFICE

ROWLAND M. HILL, OF MILWAUKEE, WISCONSIN

VARIABLE PITCH PROPELLER

Application filed March 12, 1929. Serial No. 346,355.

This invention relates to certain improvements in variable pitch propellers; and the nature and objects of the invention will be readily recognized and understood by those skilled in the arts involved in the light of the following explanation and detailed description of the accompanying drawing illustrating what I at present consider and believe to be the preferred embodiments or mechanical and aerodynamical expressions of my invention from among various other forms, embodiments, arrangements, combinations, and constructions of which the invention is capable within the spirit and the scope thereof.

The invention is primarily directed to and deals with propellers of the so-called "variable pitch" types for the propulsion of aircraft, that is, those types of propellers in which the pitch angles of the blades are variable in accordance with the conditions of operation and flight, and a main concern and aim of this invention is to overcome certain problems and practically eliminate or materially reduce certain difficulties encountered in the operation and use of such types of propellers; although all features of the invention are not limited or restricted to embodiment in or application to aircraft propellers, as certain of the features thereof are capable of adaptation to propellers generally of all types for operation in a fluid medium, and such general adaptations are contemplated by and included in the invention hereof.

A propeller of the type having blades with fixed pitch angles and operating on an airplane, will only develop its maximum efficiency when the propeller is operated at one certain advance velocity (rate of speed of forward movement or translation of the airplane), together and combined with one rate of speed of rotation of the propeller. A rapid decrease and falling off in efficiency from such maximum efficiency, follows any change in operating and flight conditions which may vary these factors of advance velocity and propeller rotation from those particular values thereof at which such propeller develops its maximum efficiency. When, for example, the airplane is flown at a decreased advance velocity from that certain advance velocity necessary to maximum propeller efficiency, the aerodynamic load on the propeller is increased, the blade pitch of course remaining the same, and the motor driving the propeller is forced to slow down, decreasing the power available therefrom and resulting in a decrease in developed propeller thrust and in propeller efficiency.

Now, with a propeller of the variable pitch type, the blades thereof are automatically rotatable to vary their pitch angles in accordance with the conditions of operation and flight, so that the propeller blades can be operated to develop maximum efficiency over a greater range than with the fixed blade propeller. Referring to the example given above of a change in operating conditions under which a decrease in advance velocity of the airplane takes place and results in decreased efficiency, with a variable pitch propeller as the aerodynamic load thereon increases by the decrease in advance velocity, the pitch angles of the propeller blades automatically decrease and permit of the motor developing its full power and tending to maintain the propeller operating at maximum efficiency. So, throughout the operating range of the propeller, as the operating and flight conditions change, the blade angles are varied to maintain the propeller operating at its maximum efficiency.

The present invention holds as an object the provision of a design and arrangement of variable pitch propeller, characterized by a rotation of the propeller blades to decrease their pitch angles by the direct action on the blades of an increase in the propeller thrust moment, and a rotation of the blades to increase their pitch angles by a decrease in the propeller thrust moment, so that the propeller tends to maintain the thrust constant and the propeller operating at maximum efficiency over a wide range of operating and flight conditions.

Another object of the invention is to provide a design of propeller and a propeller blade mounting and setting, together with cooperating mechanism and associated devices, by which the desired rotation of and variation in the pitch angles of the blades is obtained through the action of the thrust moment, in a mechanically and aerodynamically efficient manner; and further to provide for setting and maintaining the blades for their maximum efficiency under normal, average, or cruising operation and flight conditions, so that a change from those conditions causes the change in pitch angles, while a return to such conditions results in the return of the blades to their set or predetermined pitch angles.

In a variable pitch propeller a serious problem and difficulty encountered in the operation and use thereof arises from the vibrations set up in the blades. This problem arises from the fact that as a blade is moved or turned by the action of the pitch changing forces acting thereon, the blade will turn or rotate past its neutral position, and so a vibration of the blade back and forth past its neutral position as a simple pendulum results. As the propeller operates in flight, each air eddy or gust tends to increase the blade vibrations, so that, as a result the advantages gained by having the pitch of the blades variable, are offset and practically lost because the pitch is in effect too variable and therefore uncontrollable. This is a very serious problem and inherent difficulty with such types of propellers, and frequently causes such a propeller to destroy or wreck itself by such uncontrolled blade vibrations, as will be readily understood by those familiar with propellers and their operation.

The solution and elimination of the foregoing problem and difficulty forms another main object of the invention; and by the invention provision is made for eliminating or reducing vibration of the blades, through the medium of damping mechanism, so that the blades are only turned or rotated by and through the action of a steady or even change in the turning or rotating force on the blades for varying their pitch angles, and by which the tendency of the blades to vibrate as a result of such turning movements is damped out, while such damping mechanism prevents turning or rotating movements of the blades as the result of short, uneven changes in the turning forces, such as occasioned by gusts, eddies and the like, to which the blades are subjected in operation.

Another object of the invention is to provide a design, arrangement and mounting of damping mechanism of the fluid type capable of carrying out the feature of the invention for eliminating blade vibration, and further to provide for the maintenance and replenishment of the fluid in such damping mechanism, from a fluid supply carried by the propeller, through the utilization of the centrifugal forces developed by the propeller in operation.

With the foregoing general objects, as well as certain other objects and results in view which will be readily recognized from the following explanation, the invention consists in certain novel features in design and construction and in combinations and arrangements of elements, all as will be more fully and particularly referred to and specified hereinafter.

Referring to the accompanying drawing, in which similar reference characters refer to corresponding parts or elements throughout the several figures thereof:

Fig. 1, is vertical longitudinal section through the hub case of a propeller of the invention, portions of the blades being shown in elevation, and showing particularly the blade mountings, and the blade controlling and vibration damping mechanism, in elevation, within the hub case.

Fig. 2, is a vertical transverse section through the propeller hub case taken on the line 2—2, of Fig. 1, and showing particularly the arrangement of the blade controlling springs, the vibration damping cylinder and the blade connecting and coupling mechanism in operative association therewith.

Fig. 3, is a view in elevation of a propeller of the invention to show the offset of the propeller blades from their pitch varying or turning axis.

Fig. 4, is a vertical transverse section, more or less diagrammatic, through a propeller blade of the invention and indicating the effect of the thrust force on the blade tending to decrease the pitch angle thereof, due to the inclination of the blade to its turning axis.

Fig. 5, is a detail sectional view through a damping cylinder and supply tube, showing the one-way valve in the supply tube.

A possible design, arrangement and construction of variable pitch propeller embodying the principles and incorporating the several features of the invention, is illustrated in the accompanying drawing and is described in detail hereinafter, for the purpose of presenting an example of the invention, in order that those skilled in the art can readily understand the principles, features, operation and results thereof by reference to such illustration and description. However, it is to be understood that the form of the invention here illustrated is purely for the referred to purpose of explanation, and it is not disclosed for purposes of limitation, as the principles and features of the invention are adapted to various mechanical and aerodynamical embodiments, forms and arrangements, other than the exemplary form and embodiment hereof.

The illustrated examples of a variable pitch propeller of the invention, includes a hollow, and in this instance circular form of hub case C, carrying and rotatably mounting the radially disposed and diametrically oppositely extending propeller blades 10 and 20. The hub case C is formed in the example hereof, by a hollow cylindrical member having the circular side or edge wall 1, the end wall 2, and at the opposite side or end from wall 2, the removable closure plate or end wall 3 over and closing the open end of the case forming member. A propeller shaft receiving and hub forming column 4 is disposed extending axially through the interior of case C from the inner side of end wall 2, to the inner side of removable closure plate or end wall 3. (See Fig. 2.) The hub forming member or column 4 (see Figs. 1 and 3) is provided with an axial bore 5 therethrough for receiving a propeller shaft to mount the propeller on such shaft, the end walls 2 and 3 having axial bores therethrough alined with the opposite ends, respectively, of shaft bore 5, and the bore 5 being provided with the usual keyway 5' by which the propeller hub is keyed and locked in position on and to a propeller shaft (not shown). The side wall 1 of the hub case C is formed at diametrically opposite points thereon, with laterally and inwardly enlarged bearing forming portions or blocks 6 having the bores 7 extending therethrough in axial alinement transversely of and disposed radially with respect to hub case C and the hub member or column 4 thereof.

The propeller blades 10 and 20 are provided at their inner or root ends with the stub shafts or axles 30, respectively, and each axle 30 has at its outer end, the bearing flange 31, at and forming the base or root end of the propeller blade (see Fig. 1). Each of the propeller blades 10 and 20 is rotatably mounted and journaled by means of its shaft or axle 30, in one of the case bearings 6, the shaft 30 thereof extending inwardly through bearing bore 7 to the interior of the hub case C. The bearing bores 7 of bearings 6 are each suitably formed to receive and mount a roller bearing assembly 32, in which bearings the propeller blade shafts 30 are rotatably journaled. A bearing cap or disc 33 is carried by the inner end of each blade shaft 30, referring now to Fig. 1 of the drawing, and a thrust bearing 34, of the ball type in the present instance, is mounted around the shaft end between such cap 33 and the adjacent side of the case bearing block 6. In this manner each blade 10 and 20, is mounted by its respective shaft 30, extending radially from hub case C, and capable of turning or rotating movements around the axis of its shaft 30, the blade shafts 30 being rotatably journaled and confined in the respective bearings 6 of hub case C, with the thrust bearings 34 taking loads axially of the blades, and the bearings 32 taking loads radially of the blades.

According to a feature of the invention each of the propeller blades 10 and 20 is inclined or offset outwardly from its root or inner end at the shaft 30, in a direction opposite the direction in which the blades are revolved with and by the rotation of the hub case C, so that the longitudinal axis of each blade is disposed at an angle to the axis of its respective shaft 30 about which the blade turns or rotates to vary its pitch angle. This inclination or offset of the blades 10 and 20 is clearly indicated in Fig. 3 of the drawings by the axis line $a$ of the propeller blade shafts 30, and the longitudinal axis lines $b$ of the blades 10 and 20. The direction of rotation or revolution of the propeller with blades 10 and 20 is indicated by the arrow in Fig. 3, and as the blades are at opposite sides of the hub case they of course are inclined in opposite directions from the line $a$ of the blade shaft axis, with the leading edges 11 and 21, respectively, of the blades 10 and 20, intersecting or inclining across the shaft axis line $a$ with the blade tips spaced from and at opposite sides of this axis line in the particular example of the invention here presented.

The propeller blades 10 and 20, are set at certain pitch angles to the plane of their rotation by and with the propeller, as shown by Fig. 4 of the drawing, and the thrust indicated by T in Fig. 4, developed by the propeller in operation, due to the inclination of the blades from their turning axis $a$, tends to turn or rotate the blades to decrease the pitch angles thereof. However, mechanism is provided by the invention by which the turning movement of the blades by the thrust force is resisted up to a certain magnitude of such force, but is overcome by an increased thrust force to permit of turning the blades to decrease their pitch angles.

Referring now to Figs. 1 and 2 of the drawing, the shaft 30 of propeller blade 10 is provided at its inner end within hub case C with a crank 12 extending from cap 33, and the shaft 30 of blade 20 is provided with a similar crank 22 extending from cap 33 thereof, but in the opposite direction to crank 12. These cranks 12 and 22 extend across the interior of hub case C at opposite sides of the hub member 4, toward opposite sides of the case wall 1 where they terminate in the arms 14 and 24, respectively, extending laterally therefrom across the hub case C. Each crank arm 14 and 24 is connected at a point intermediate its length to one end of a coil spring 25, the opposite end of the spring being secured to the hub case wall 2. These springs 25 are of the expansion type in the example thereof, and are in position interposed between arms 14 and 24, respectively, and the case wall 2, so as to resist movements of the crank arms toward the springs tending to compress the same on turning of the propeller blades 10 and 20 to decrease their pitch angles moves the arms 14 and 24 to compress the springs 25, but the springs are designed to resist and overcome such movements and hold the blades set at a predetermined pitch angle under the action of a thrust force of a certain magnitude.

The propeller blades 10 and 20 are also coupled and interconnected so that turning movement of one blade to change its pitch, causes turning movement of the other blade to correspondingly and equally vary its pitch, in order to insure of the blades being maintained at the same angles of pitch and the propeller balance. In carrying out such interconnecting of the blades in the embodiment thereof, the hub column or member 4 is provided with the longitudinally disposed dove-tail grooves 26 therein at opposite sides thereof facing blade shafts 30. A roller member 27 is disposed for longitudinal movement in each groove 26, and these rollers are mounted and carried on the outwardly extended studs or pins 27'. Oppositely extending links 28 are pivotally connected to the crank arms 24, respectively, so that each crank arm of the propeller blade shafts 30, is pivotally coupled by the pairs of links 28, and any movement of one crank arm is transmitted by these links to and results in a corresponding movement of the other arm.

The invention further provides for the practical elimination of vibrations resulting from turning movements of the propeller blades on their shafts 30. This is accomplished in the present example by a system of oil damps comprising oil cylinders 40 mounted in the hub case C on the wall 2 thereof at opposite sides of the hub member 4 and disposed between the spaced pairs of links 28, as will be clear by reference to Figs. 1 and 2 of the drawing. A piston or plunger 41 is slidably mounted in each cylinder 40 in a body of oil or other fluid therein, and is pivotally coupled to a cross member or bar 42 between the opposite links 28, by a piston rod 43. The diameters of the pistons or plungers 41 are slightly less than the internal diameters of their respective cylinders as shown by the upper cylinder of Fig. 2, to permit passage of oil past the pistons as they are moved through the cylinders and the oil therein, although if desired, other arrangements to this end may be provided. (See particularly Fig. 2.) Thus, as the links 28 are moved by turning movements of the propeller blades, the pistons 41 in the cylinders 40 are moved through and against the bodies of oil in the cylinders, which results in the damping out and practical elimination of vibrations of the blades. The uneven forces to which the blades 10 and 20 are subjected by eddies or gusts in the operation of the propeller are counteracted by the foregoing system and effectively damped out to prevent the usual vibratory movements of the blades.

In order to maintain and replenish the supply of oil or other fluid in the damping cylinders 40, a reservoir is provided in the hub case C and fluid therefrom is supplied to the cylinders automatically by the centrifugal forces developed by the rotation of the hub case during operation of the propeller. Such reservoir in the present example, takes the form of an annular and substantially tubular oil or fluid container 44 mounted within the hub case C around the hub member 4 thereof. This container 44 is provided with a valve filling member or fitting 45 which extends to the exterior of the hub case through the wall 2 thereof, through which oil can be supplied to the container to replenish the supply therein. Each damping cylinder 40 is coupled adjacent its lower end through the side of the cylinder with a fluid supply tube 46, which extends radially from the container 44 to and discharges into the cylinder, and a spring closed ball valve 47 is mounted in each tube for one-way opening to permit discharge through tube 46 into the cylinder. Fluid is forced to flow by the action of centrifugal force from the container 44, through the tubes 46 and the valves 47 into the cylinders 40, the pressure developed forcing the valves open and permitting flow of fluid therethrough. However, in order to prevent any effect of the centrifugal force acting to retard or interrupt the free operation of the valves 47, the supply tubes are bent to locate the part of valve movement on a constant radius about the propeller hub, as clearly shown by Fig. 5 of the drawing.

With the foregoing arrangement of automatic fluid supply, when the amount of oil or fluid in a damping cylinder 40 decreases, on the first outward stroke of the cylinder piston 41, a decrease in pressure is caused on the inner side of the piston, and aided by the oil pressure in container 44, caused by centrifugal force, the supply of oil in the cylinder is replenished through tube 46. The supply of oil or other fluid in the damping cylinders 40 is thus maintained at all times at its maximum for proper and efficient operation of the damping mechanism, and the possibility of vibrations of the blades with the resulting injurious and frequently disastrous results to the propeller is reduced to a practically negligible minimum.

A variable pitch propeller embodying the principles and various features of the invention as described and explained above, when for example, mounted on an airplane for operation, has the propeller blades 10 and 20 set at the proper pitch angles for maximum efficiency with the airplane to secure, say cruising performance of the latter, under the advance velocity, propeller revolution, and thrust factors necessary to such propeller efficiency and airplane performance. The blade controlling springs 25 are given and have a compression value which will resist and overcome the action of the thrust forces developed by and under the foregoing operating and flight conditions, tending to turn the blades 10 and 20 on their shafts 30 to reduce the pitch angles, so that the blades are held and maintained at the desired pitch angles by these springs balancing the thrust forces.

Now, if for example, the operating and flight conditions are changed so that the advance velocity of the airplane is decreased and the aerodynamic load on the propeller is increased resulting in an increase in the thrust moment T (Fig. 4), then the increased thrust moment neutralizes the centrifugal force moment and the compression values of spring 25 are overcome, the blades turning on their shafts to decrease the pitch angles, and by crank arms 24 moving toward springs 25, these springs are compressed. In this manner the blades are given the required pitch angles for maximum efficiency and flight conditions. Upon return to the cruising, so-called, conditions the thrust moment decreases and the springs 25 move arms 24 to turn the blades 10 and 20 to increase the pitch angles to that required for such operating conditions.

The thrust moment, therefore, directly acts upon and changes the pitch of the blades to decrease the pitch as such moment or force increases, and to increase the pitch as it decreases, so that the propeller blades are operated at pitch angles to maintain maximum efficiency over and through substantially the range of propeller operating and flight conditions. Throughout the operation of the propeller the damping mechanism described, functions and operates to eliminate vibrations, and as both the variations of blade pitch and such damping mechanism are automatic in their operation, a propeller of the variable pitch type is presented in which the several problems and difficulties inherent in such types have been eliminated, and which is efficient, practical and safe under the conditions of operation and use.

It is evident that various changes, modifications, variations, substitutions, and additions might be resorted to without departing from the spirit and scope of my invention, and hence I do not desire to limit myself in all particulars to the exact and specific disclosures hereof.

Desiring to protect my invention in the broadest manner legally possible,

What I claim, is:

1. The combination in a variable pitch propeller, of a propeller blade rotatable on an axis longitudinally of the blade to vary its pitch and means controlling pitch varying rotation of said blade, with means for damping vibrations of said blade caused by rotation of the blade.

2. The combination in a variable pitch propeller, of a propeller blade rotatable to vary its pitch and means controlling pitch varying rotation of said blade, with blade vibration damping means of the fluid type operatively associated with said blade for damping out vibrations of the blade caused by pitch varying rotation thereof.

3. In a variable pitch propeller, in combination, a propeller blade rotatable on an axis longitudinally of the blade to vary its pitch, yielding means opposing rotation of the blade, and means for damping vibrations of the blade.

4. In a variable pitch propeller, in combination, a propeller blade rotatable to vary its pitch, blade vibration damping means including a fluid filled cylinder, and means carried by the propeller for supplying fluid to said cylinder.

5. In a variable pitch propeller, a propeller blade rotatable to vary its pitch, blade vibration damping means of the fluid type including a fluid containing cylinder, and means carried by the propeller for supplying fluid to said cylinder by the action of centrifugal force developed by the propeller in operation.

6. In a variable pitch propeller, a propeller blade rotatable to vary its pitch, blade vibration damping means of the fluid type including a fluid containing cylinder, a fluid supply container on the propeller in communication with said cylinder, a valve controlling flow of fluid from said container to said cylinder, and fluid forced from the supply container through said valve to the cylinder by the action of centrifugal force developed by the propeller in operation.

7. In a variable pitch propeller, a propeller blade rotatable to vary its pitch, blade vibration damping means of the fluid type including a fluid cylinder, a fluid supply container, a fluid supply line from the container to said cylinder, and a one-way check valve in said line opening under pressure developed by the action of centrifugal force with the propeller in operation to cause flow of fluid therethrough from the container to the cylinder.

8. In a variable pitch propeller, a plurality of propeller blades each rotatable on an axis longitudinally of the blade to vary its pitch, and vibration damping means of the fluid type operatively associated with each blade, respectively, to damp vibrations set up by rotating the blade to vary its pitch.

9. In a variable pitch propeller, a plurality of propeller blades each rotatable to vary its pitch, vibration damping means of the fluid type operatively associated with each blade, respectively, to damp vibrations set up by rotating a blade to vary its pitch, and a fluid supply container carried by the propeller in communication with said damping means for supplying damping fluid thereto, respectively.

10. In a variable pitch propeller, a hub case, a propeller blade rotatably mounted in said case for varying the pitch of the blade, and damping means of the fluid type carried by said case and operatively associated with said blade to damp out vibration of the blade set up by rotating the blade to vary its pitch.

11. In a variable pitch propeller, a hub case, a propeller blade rotatably mounted in said case for varying the pitch of the blade, a crank arm on the inner end of the blade within the case, and damping means of the fluid type mounted on said case and operatively coupled to said crank arm to damp out vibration of the blade set-up by rotating the blade to vary its pitch.

12. In a variable pitch propeller, a hub member, a blade extending radially from and rotatably mounted in said hub member for varying the pitch of the blade, damping means of the fluid type mounted on said hub member and operatively associated with said blade to damp out blade vibration set up by rotating the blade to vary its pitch, and a fluid supply on said hub member in communication with said damping means, the said fluid supply located on the hub member nearer the propeller axis of revolution than said damping means to cause fluid to be supplied to said means by the action of centrifugal force with the propeller in operation.

13. In a variable pitch propeller, a blade rotatable to vary its pitch, yielding means opposing pitch varying rotation of said blade, and damping means of the fluid type operatively associated with said blade to damp out vibration set-up by pitch varying rotation of the blade.

14. In a variable pitch propeller, a hub case, a propeller blade rotatably mounted in and extending radially from said case, a crank arm carried by the blade within the case, a spring connected between the arm and the case opposing pitch varying rotation of the blade, and damping means operatively coupled with said arm to damp vibration set up by pitch varying rotation of the blade.

15. In a variable pitch propeller, a hub case, a plurality of propeller blades extended radially from said case and rotatably mounted therein for varying their pitch, a crank arm on each blade within the case, spring means connected between each crank arm and the case opposing rotation of its respective blade to vary the pitch, and damping means operatively associated with each blade crank arm to damp out vibration set-up by pitch varying rotation of the blade, respectively.

16. In a variable pitch propeller, a hub case, a plurality of propeller blades extending radially from and rotatably mounted in said case for varying the pitch of the blades, respectively, an arm extending radially from each blade within the case, an expansion spring connected between each arm and the case opposing rotation of the blade to decrease its pitch, the damping means for each blade operatively associated with the blade arm for damping vibration set-up by pitch varying rotation of the blade.

17. In a variable pitch propeller, propeller blades each mounted for rotation by the action of the propeller thrust force thereon to decrease the pitch angles of the blades, expansion spring means for counteracting and balancing such thrust force at a predetermined magnitude thereof to maintain the blades at predetermined pitch angles, mechanism operatively coupling the blades with said spring means and the spring means compressible by said mechanism by an increase in the thrust force with resulting rotation of the blades to decrease the pitch angles until the increased thrust force is balanced by the spring means to set the blades at the decreased pitch angles, and fluid damp means operatively coupled with the mechanism coupling said spring means and the blades for damping out vibrations of the blades set up by pitch varying rotation of the propeller blades.

18. The combination in a variable pitch propeller, of a propeller blade rotatable to vary its pitch, and mechanism controlling pitch varying rotation of said blade, with damping means operatively coupled to said mechanism for damping out and preventing vibrations of said blade.

19. The combination in a variable pitch propeller, of a propeller blade automatically rotatable under the action of the propeller thrust force to vary its pitch, and mechanism controlling pitch varying rotation of the blade, of fluid damping means operatively associated with said mechanism for damping out and preventing vibration of the blade resulting from pitch varying rotation thereof.

Signed at Milwaukee, Wisconsin, this 6th day of March, 1929.

ROWLAND M. HILL.